United States Patent [19]

Wait

[11] Patent Number: 5,037,238
[45] Date of Patent: Aug. 6, 1991

[54] PROCESS FOR RAISING SUNKEN SPRINKLER HEADS

[76] Inventor: Thomas R. Wait, 9350 Long Meadow Cir., Boynton Beach, Fla. 33436

[21] Appl. No.: 566,127

[22] Filed: Aug. 13, 1990

[51] Int. Cl.$^5$ .............................................. E02B 11/00
[52] U.S. Cl. ...................................... 405/51; 405/42; 405/36
[58] Field of Search ..................... 405/36, 42, 51, 154, 405/163; 37/189, 61, 62, 63

[56] References Cited

U.S. PATENT DOCUMENTS

| | | | |
|---|---|---|---|
| 3,107,056 | 10/1963 | Hunter | 239/242 X |
| 3,261,553 | 7/1966 | Hunter | 239/242 |
| 3,713,584 | 1/1973 | Hunter | 239/206 |
| 4,301,606 | 11/1981 | Hofmeester | 405/163 X |
| 4,479,741 | 10/1984 | Berti et al. | 405/163 |
| 4,850,532 | 7/1989 | Mackanos | 239/242 X |
| 4,867,603 | 9/1989 | Chang | 405/36 X |
| 4,900,189 | 2/1990 | Barosso et al. | 405/36 X |
| 4,971,690 | 11/1990 | Justice | 405/36 X |

Primary Examiner—Dennis L. Taylor
Assistant Examiner—J. Russell McBee
Attorney, Agent, or Firm—Howard J. Greenwald

[57] ABSTRACT

A process for raising a sunken, in-ground sprinkler is provided. In the first step of this process, which is especially useful with pop-up sprinklers, the area around the top of the sprinkler is first cleared. Thereafter, the motor compartment structure and the rotatable sprinkler head are removed from the sprinkler housing. A circular sleeve adaptor is then attached to the sprinkler housing, and a threaded shaft is then attached to the adaptor. A support platform, with a hole in its middle, is then placed over the sprinkler, and one end of the threaded shaft is placed through the hole. A wing nut is then attached to the threaded shaft, and the rotation of the wing nut causes it to contact the top of the support platform, thereby raising the sprinkler assembly.

20 Claims, 8 Drawing Sheets

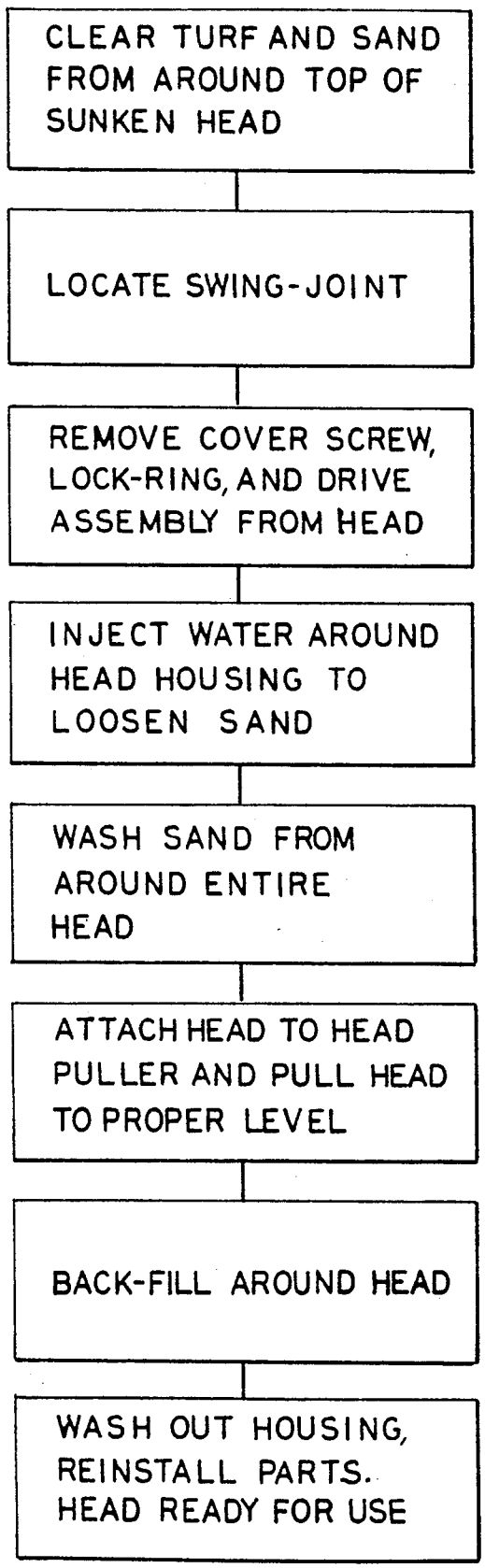
FIG:1A

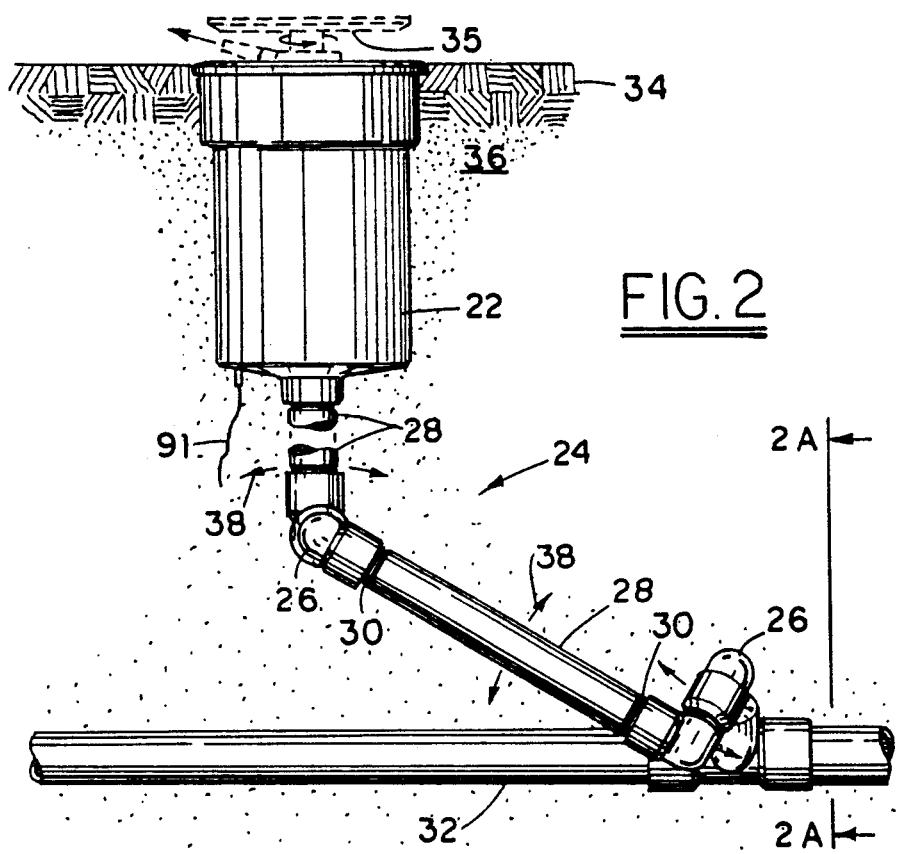
FIG. 2
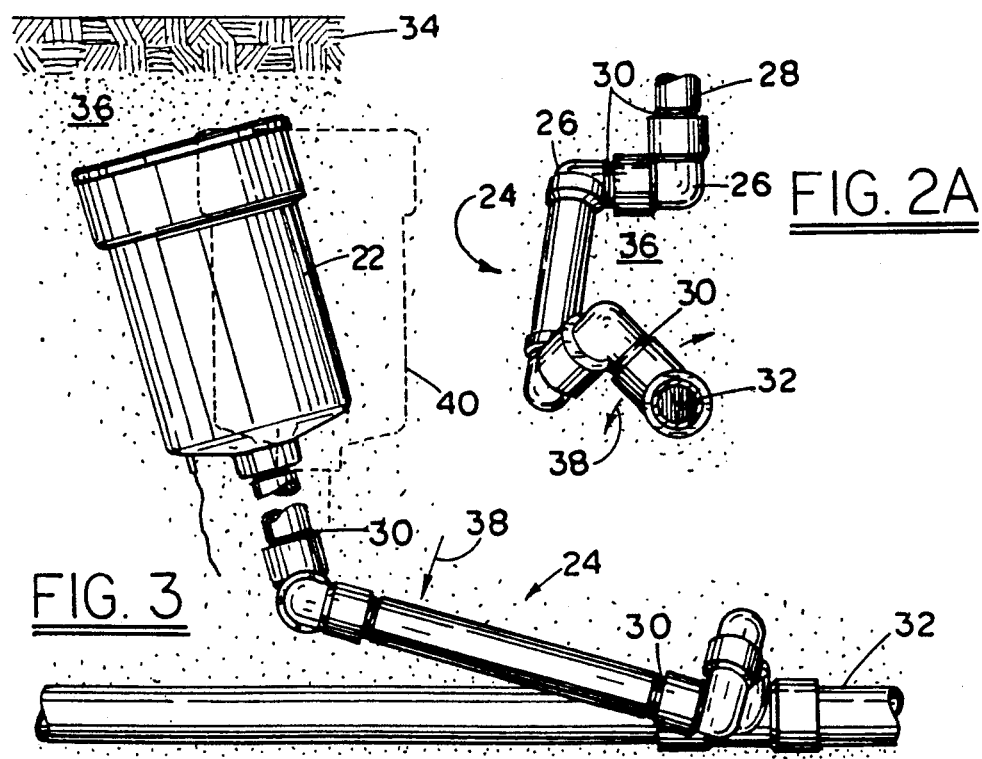
FIG. 2A
FIG. 3

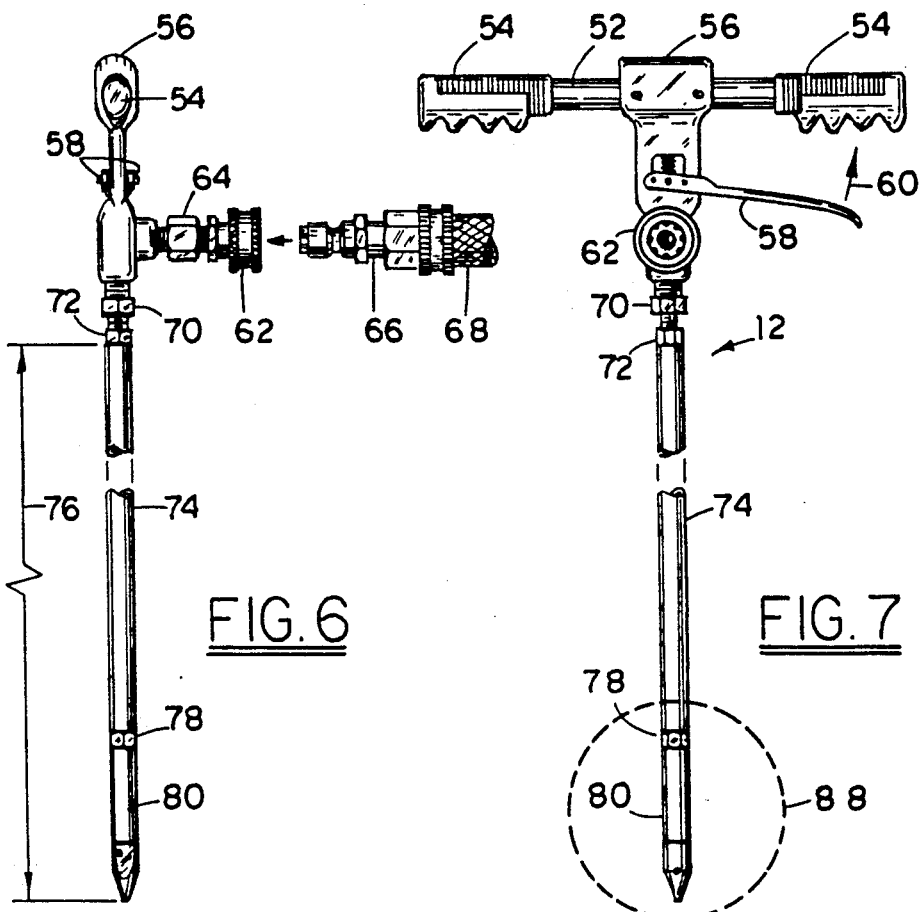
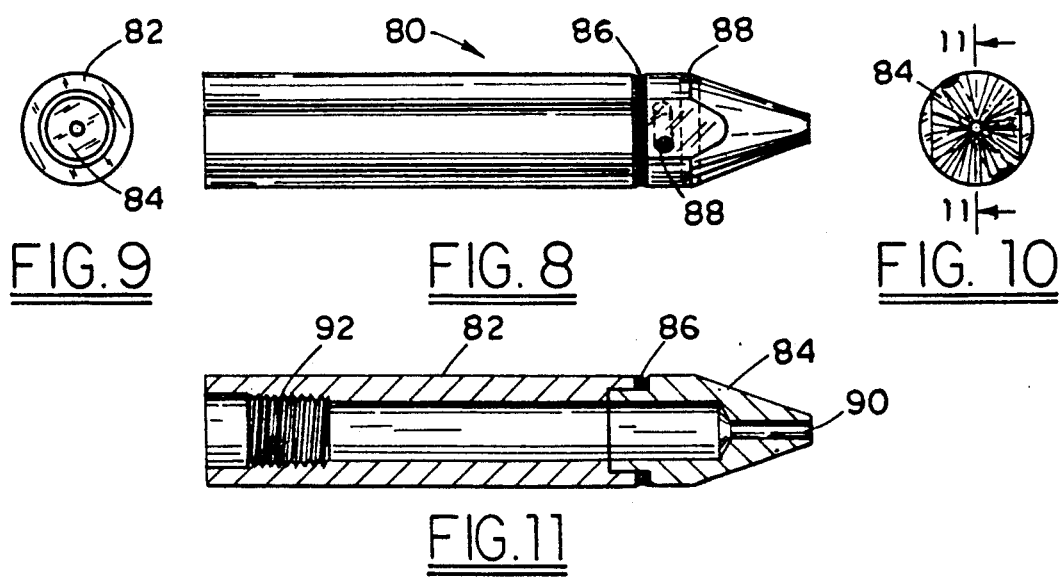

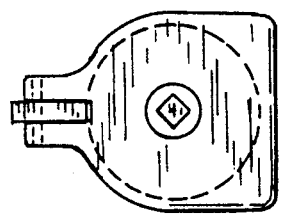
FIG. 15
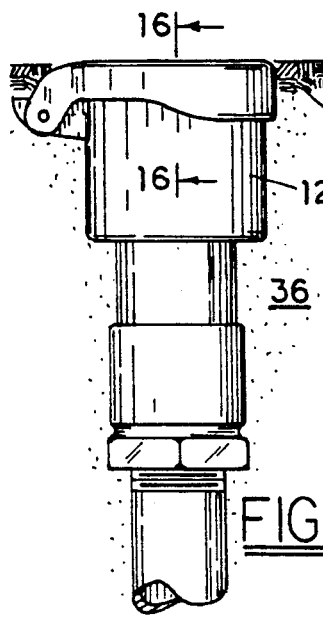
FIG. 14
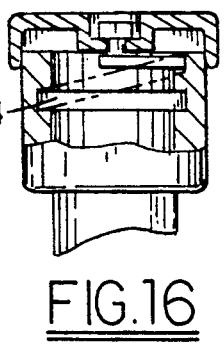
FIG. 16
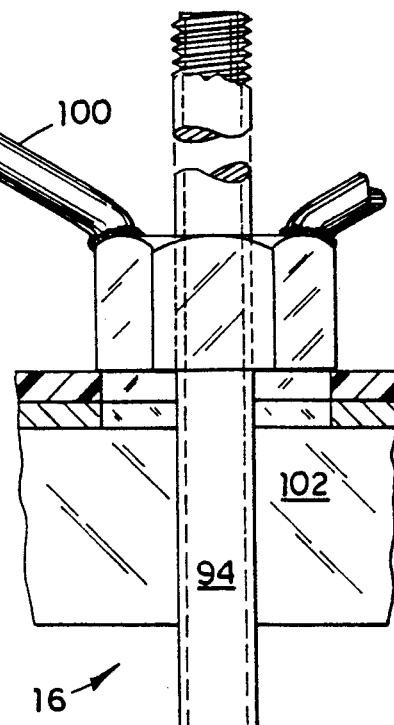
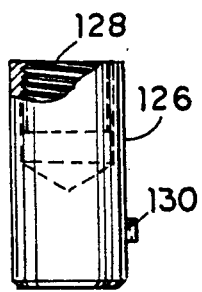
FIG. 17
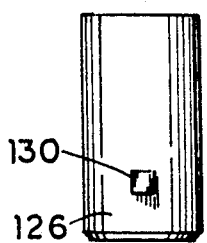
FIG. 18
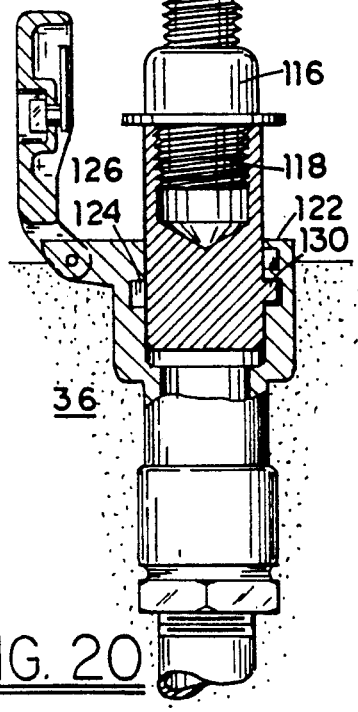
FIG. 20
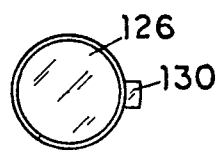
FIG. 19

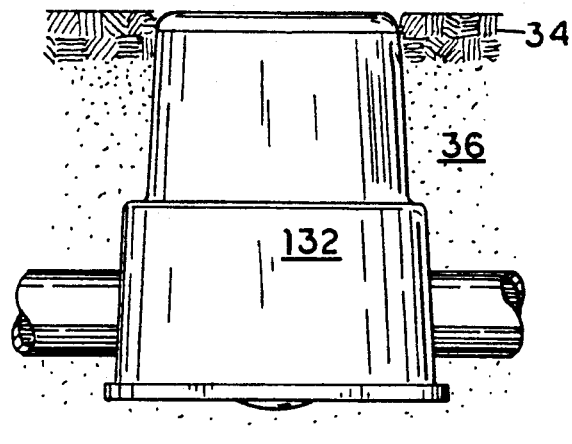
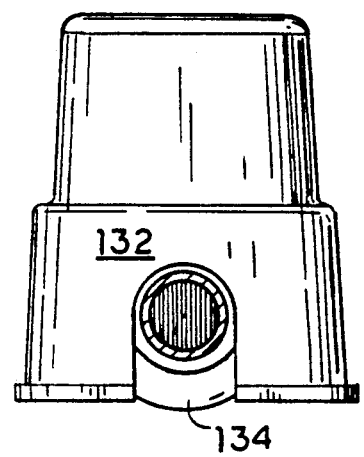
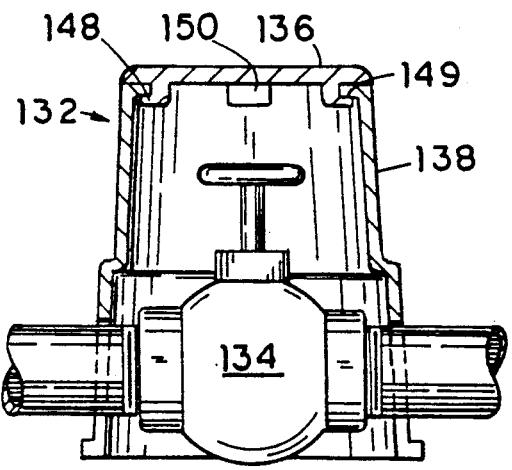
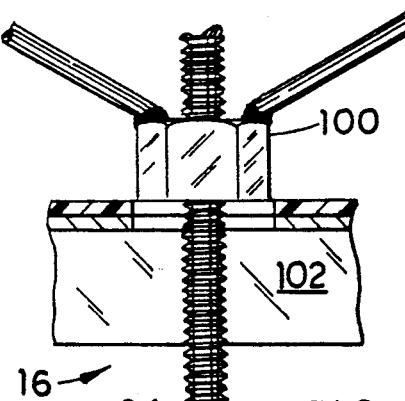
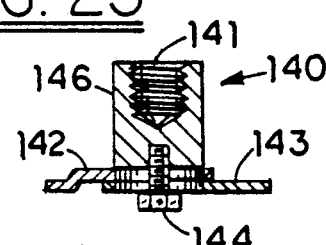
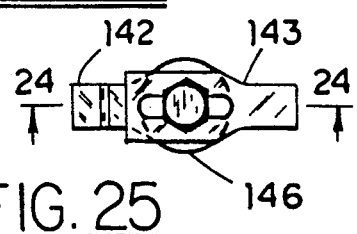
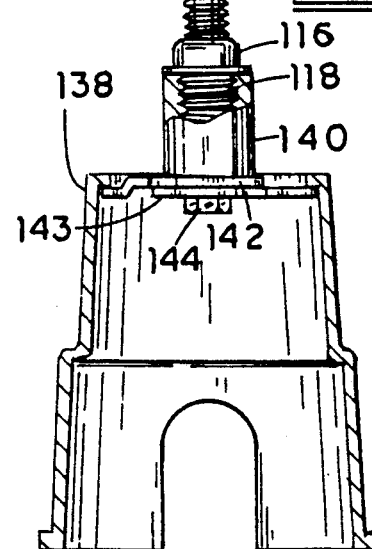

PROCESS FOR RAISING SUNKEN SPRINKLER HEADS

FIELD OF THE INVENTION

An process and an apparatus for raising irrigation system sprinkler heads that have sunk to a position under the surface of the ground.

BACKGROUND OF THE INVENTION

Irrigation systems utilizing multiple sprinkle heads have been used to water large areas of..turf on lawns, parks, golf courses, and the like. These systems usually contain a large water pipe ("lateral") that is buried several feet below the ground surface and, as off-shoots from the lateral, smaller pipes ("risers") extending upward to where the sprinkle heads are located. The sprinkler heads of most modern systems are often mounted substantially even with the surface of the turf topsoil; and such sprinkler heads often have a "pop-up" feature.

Some pop-up sprinklers which have found wide commercial acceptance are described in U.S. Pat. Nos. 3,107,056, 3,261,553, and 3,713,584 of Hunter. An improved pop-up sprinkler structure is disclosed in U.S. Pat. No. 4,850,532 of Mackanos. The disclosure of each of these patents is hereby disclosed by reference into this specification.

In general, in the pop-up sprinkler structures, a flat disc covers the sprinkler nozzles and the rotational member to which the nozzles are mounted; thus, when the system is not in use, only the flat disc laying level with the ground is visible when the system is not in use.

When the pop-up nozzle is energized by water pressure, the plate and nozzles rise several inches above the ground surface; and, with the nozzles rotated around the sprinkler heads by an integral, water-driven hydraulic motor, large areas of turf can be evenly watered. When the water pressure is removed, the nozzles and the cover plate return downward.

Many of the pop-up sprinklers currently in use are connected to the risers by swing-joints. As is known to those skilled in the art, these joints are flexible, and they usually are comprised of a combination of piping elbows, nipples, and short lengths of pipe. With the use of such a joint, one may form a flexible riser to allow precise positioning of the sprinkler head in the ground surface. See, for example, an article entitled "Swing Joints—Vital Components of Valve-In-Head Irrigation Systems," appearing at pages 35 et seq. of the March, 1989 issue of "Sports Turf" magazine(Gold Trade Publishing Company, Van Nuys, Calif.), the disclosure of which is hereby incorporated by reference into this specification.

However, with some irrigation systems, the flexibility of the swing-joint system can cause problems. Thus, for example, with golf courses that are located in a sandy location (such as. e.g., in Florida), the turf laid over the sandy substrate must be irrigated regularly. Because both the sprinkler head and its attendant swing joint repose in sand, after a period of time the combination of the sprinkler head movement, the flexibility of the swing joint, and the plasticity of the water-soaked sand cause the sprinkler head to become buried in the sand. Once the occurs, the sprinkler system cannot function well.

It is an object of this invention to provide a process for raising and repositioning sunken sprinkler heads.

It is another object of this invention to provide an apparatus for raising and repositioning sunken sprinkler heads.

SUMMARY OF THE INVENTION

In accordance with this invention, there is provided a process for raising and repositioning a sunken sprinkler head. In the first step of this process, turf and/or topsoil and/or sand are cleared from the top of a sprinkler head assembly. Thereafter, the sprinkler is partially disassembled, and the partially disassembled sprinkler is then connected to a platform puller. Thereafter, the area around the sprinkler is saturated with water, and the sprinkler is pulled up with the platform puller.

DESCRIPTION OF THE DRAWINGS

The present invention will be more fully understood by reference to the following detailed description thereof, when read in conjunction with the attached drawings, wherein like reference numerals refer to like elements, and wherein:

FIG. 1A is a flow diagram illustrating one preferred embodiment of the process of the invention;

FIG. 2 is a side elevational view of a pop-up sprinkler head, a swing joint, and a lateral installed in their proper positions and relationships;

FIG. 2 is a front elevational view of the swing joint and lateral shown in FIG. 2, taken along line 2A—2A of FIG. 2;

FIG. 3 is a side elevational view of the pop-up sprinkler head and the swing joint of FIG. 2 when they are in a sunken position;

FIG. 6 is a side elevational view of a water injector assembly;

FIG. 7 is a front elevational view of the water injector assembly shown in FIG. 6;

FIG. 8 is an enlarged, side elevational view of a water injector nozzle assembly;

FIG. 9 is a rear elevational view of the nozzle assembly shown in FIG. 8;

FIG. 10 is a front elevational view of the nozzle assembly shown in FIG. 8;

FIG. 11 is a cross-sectional view of the nozzle assembly shown in FIG. 8;

FIG. 14 is a side elevational view of a quick-coupler valve;

FIG. 15 is a plan view of a quick-coupler valve;

FIG. 16 is a cross-sectional view of a quick-coupler valve;

FIG. 17 is a side elevational view of a quick-coupler valve puller;

FIG. 18 is a front elevational view of a quick coupler valve puller;

FIG. 19 is a bottom view of a quick coupler valve puller;

FIG. 20 is a side elevational view showing a quick-coupler valve puller pulling a quick coupler valve;

FIG. 21 is a side elevational view of a round valve box;

FIG. 22 is a front elevational view of a round valve box;

FIG. 23 is a side cross-sectional view of a round valve box;

FIG. 24 is a side elevational view of a valve box puller;

FIG. 25 is a bottom view of a valve box puller; and

FIG. 26 is a side cross-sectional view of a valve box puller pulling a valve box.

DESCRIPTION OF THE PREFERRED EMBODIMENTS

Figure 1:
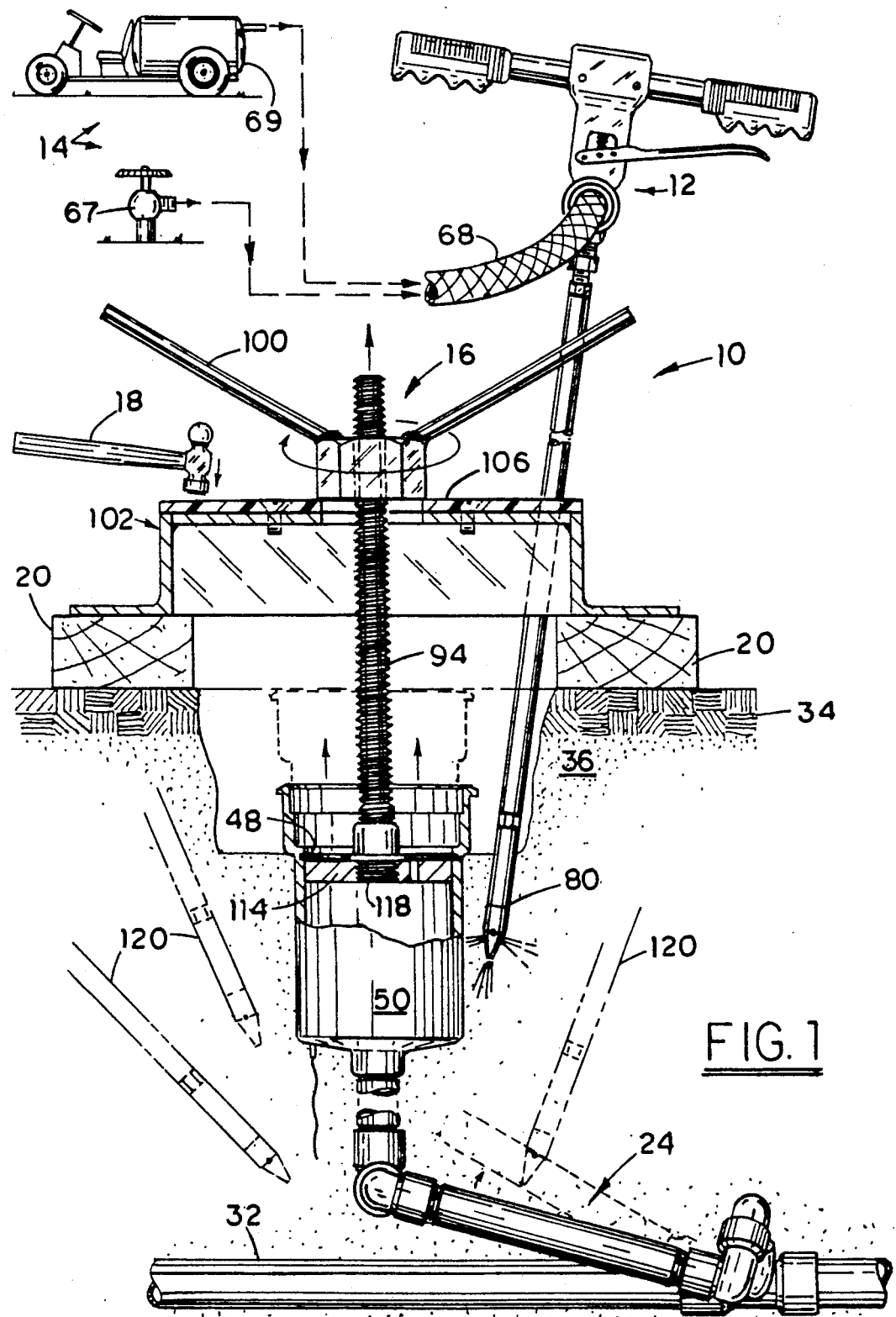
FIG. 1 is a composite illustration showing all of the components and elements used in one preferred embodiment of the apparatus of this invention.
Figure 4:
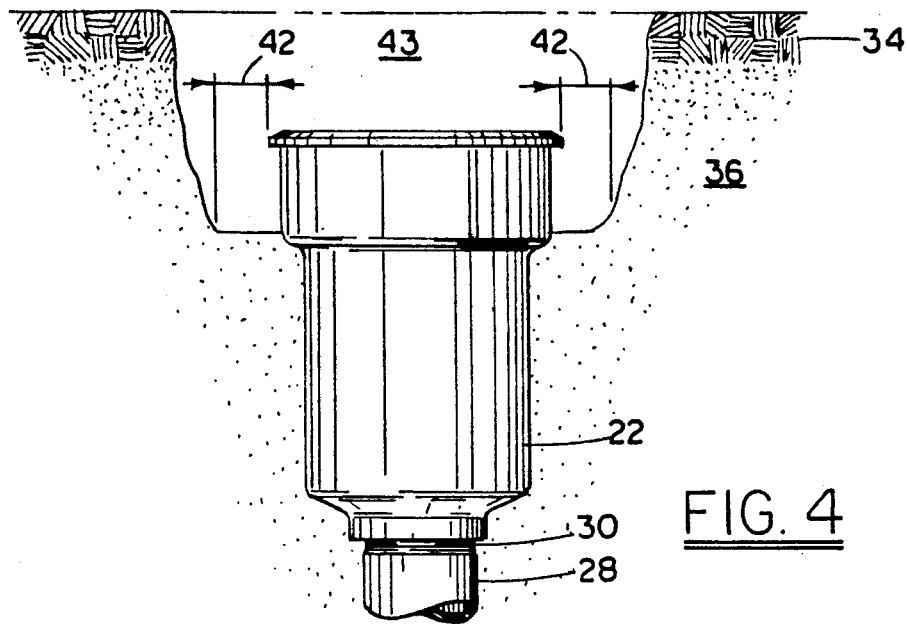
FIG. 4 is a side elevational view of the sprinkler head of FIG. 3, with the upper portion of the earth around it being partially excavated.

Referring to FIGS. 1 through 5, a preferred embodiment of the apparatus 10 of this invention is illustrated. This apparatus 10 is comprised of means 12 for injecting water into the ground, a source 14 of high-pressure water, a means 16 for pulling the sprinkler head assembly towards to the surface of the ground, a means 18 for causing shock waves to travel through the puller apparatus, and means 20 for supporting means 16.

Referring to FIG. 2, a preferred pop-up sprinkler which may be used with the process of this invention is illustrated. This sprinkler is similar to the sprinkler described in U.S. Pat. No. 3,107,056 of Hunter.

U.S. Pat. No. 3,107,056 of Hunter discloses a sprinkler comprising a housing having a sprinkler compartment, a motor compartment, an inlet communicating with said motor compartment, and a motor housing structure disposed within the motor compartment The housing structure defines a major chamber adjacent to said inlet, a final gear chamber adjacent to said sprinkler compartment, a flow chamber between said motor chamber and final gear chamber, a primary gear chamber at one side of said flow chamber and also between said motor chamber and said gear chambers. The sprinkler also comprises an internal gear member mounted in said final gear chamber and including a tubular hub extending axially through said final gear chamber from said flow chamber; a sprinkler head connected with said hub to rotate with said internal gear; a turbine element in said turbine chamber, there being turbine inlet ports in the walls of said turbine chamber and passage means connecting said turbine chamber with said flow chamber for discharge of water through said sprinkler head; a gear train in said primary gear chamber operatively connected with said turbine element; shiftable drive means in said final gear chamber operatively connected with said gear train and having alternatively operable terminal gears engageable with said internal gear to turn said internal gear in opposite directions; and means for shifting said drive means to cause operative engagement of either terminal gear with said internal gear.

U.S. Pat. No. 3,261,552 of Hunter, which also may be used with applicant's process, describes a preferred sprinkler structure which includes a housing having an inlet at its lower end and a cap at its upper end supported by a sprinkler head which is capable of limited extension and retraction. When retracted, the sprinkler head is enclosed within a sprinkler head compartment formed within the housing. Below the sprinkler head compartment the housing forms a motor compartment which receives a motor shell having a turbine drive and gear reduction means. The motor shell is provided with a partition forming the lower side of a sealed drive compartment. Centered in the drive compartment is a tubular sleeve which journals a tubular bearing; slideably mounted in the tubular bearing is a tubular stem, the upper end of which is connected to the sprinkler head and the lower end of which communicates with the inlet.

U.S. Pat. No. 3,713,584 of Hunter discloses a sprinkler comprised of a drive system for effecting rotation of the nozzle. The drive system includes a lower perforated plate for admitting water to the interior of the gear case. A shaft supports a turbine wheel immediately above the perforated plate so that upwardly flowing water from the plate engages and drives the turbine wheel. The upper end of the shaft is provided with an initial drive gear. Gear shafts are provided which support a gear train comprising a plurality of gear units, each gear unit consisting of a pinion gear element and a spur gear, with the exception of the first gear unit, in which the larger lower gear is a ring gear.

Referring again to FIG. 2, in the preferred embodiment illustrated therein, pop-up sprinkler head assembly 22 is shown installed in the ground with the top surface of the sprinkler essentially flush with the grade of the turf and topsoil 34; when so flush, the sprinkler assembly 22 is in its de-energized mode. When it is energized the introduction of water into the sprinkler assembly 22, the assembly 22 pops up into the position shown by dotted lines and arrows 35.

Referring again to FIG. 2, the sprinkler head assembly 22 sets in soil 36 which may be comprised of sand, gravel, clay, mixtures thereof, and the like. The soil 36 is below topsoil 34; and such soil 36 extends downward and encompasses swing joint assembly 24 and lateral 32.

The preferred embodiment of the swing joint assembly 24 illustrated in FIG. 2 consists of at least two pipe elbows 26 and at least one short length of pipe 28 which are connected to each other and are held together by threaded joints 30. The whole assembly forms a riser between the lateral 32 and the sprinkler head assembly 22.

FIG. 2A shows the swing joint assembly 24 as viewed along lines 2A—2A of FIG. 2. It will be apparent to those skilled in the art how flexible such assembly is (see arrows 38) and how such flexibility allows the sprinkler head assembly 22 to be installed and positioned substantially flush with the turf and topsoil surface 34.

Referring to FIG. 3, a sprinkler head assembly 22 is shown sunken beneath the turf and topsoil 34, in soil 36. In this position, the sprinkler assembly 22 is substantially inoperable. The same flexibility of the swing-joint assembly 24 which allows for easy sprinkler head installation also presents allows the head to be moved readily easily. As a result, after repeated operation of sprinkler assembly 22, the sprinkler head tends to become buried in the soil 36 as a result of reaction of the assembly to the high pressure water coming out of the sprinkler head nozzles and the fluidity of the soaked soil 32 (which facilitates movement of the assembly in it). The sprinkler head may be buried in a slanted position (see FIG. 3), a vertical position (see dotted lines 40), and other positions.

The process of raising and repositioning sprinkler head assembly 22 is illustrated, in flow chart form, in FIG. 1A.

In the first step of this process, soil and/or thatch are cleared from around the top of the body of the sunken sprinkler assembly 22. In general, enough of said soil and/or thatch are removed to leave at least about a 2.0 inch gap the top of such body and the soil and/or thatch; and said gap preferably extends at least about 2.0 inches down from the top of the sprinkler assembly 22. Thus, referring to FIG. 4, a sufficient amount of said material will be removed to leave at least about a 2 inch border 42 between the turf and the sprinkler head and a cavity 43 above the sprinkler head. The removal of said material may be done by any means well known to those skilled in the art such as, e.g., with a common shovel or a commercially available special power tool attachment named "DonuTTrimmer" (available from DonuTTrimmer Equipment, Inc., Boynton Beach, Fla.)

Referring again to FIG. 1A, the second step of the process is to locate the approximate location of the swing joint 24 and/or the riser. Any means well known to those skilled in the art may be used to locate said swing joint 24 and/or riser. Thus, e.g., one may dig around the sprinkler head until the riser is located, measure the response of sound waves directed at various points in the ground, probe with a sharp instrument, etc.

In one embodiment, the approximate location of the swing joint 24 and/or the riser is determined with a "LOCAT," which is a device for locating hidden water and sewer pipes (available from Bloch and Company, P.O. Box 18058, Cleveland, Ohio 44118).

Once the approximate location of the swing joint 24 has been determined, the sprinkler assembly 22 is disassembled in order to attach a valve and head sprinkler adaptor thereto.

In general, the pop-up sprinkler will be comprised of a cylindrical housing, a motor compartment structure, and a rotatable sprinkler head. The cylindrical housing will generally have a sprinkler compartment, a motor compartment, and an inlet communicating with the motor compartment. The bottom end of the cylindrical housing will be closed except for the inlet; and, above the bottom end of the cylindrical housing, the housing will form such motor compartment. Above the motor compartment, the housing will be radially enlarged to form the sprinkler compartment. The sprinkler head generally will be capable of limited extension and retraction. When it is retracted, the sprinkler head will be enclosed within the sprinkler head compartment formed within the housing. The sprinkler head will be operatively connected to the motor compartment structure.

Figure 5:
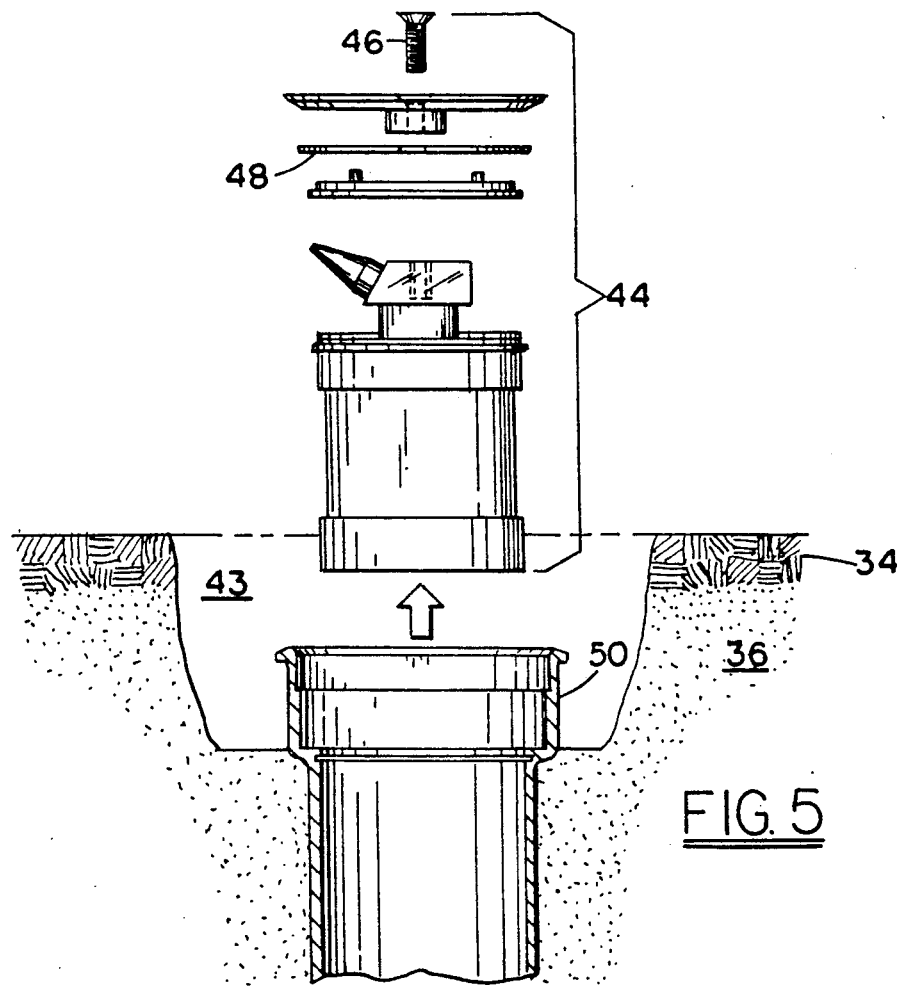
FIG. 5 is an exploded view of the sprinkler head shown in FIG. 4.

In the process of this invention, as is illustrated in FIG. 5, the motor compartment structure and the rotatable sprinkler head are removed from the cylindrical housing of the sprinkler prior to the installation of the adaptor of this invention. Thus, referring to FIG. 5, screw 46 is removed along with snap ring 48. This will allow removal of sprinkler internal parts 44, which include the hydraulic drive motor and the nozzle assembly After these parts have been removed, an empty sprinkler head housing is left.

Into the empty sprinkler head housing is inserted a valve and head sprinkler adaptor. One embodiment of this adaptor is described in U.S. Pat. No. 4,850,532 of Mackanos. Another embodiment of this adaptor is illustrated in FIG. 13.

Figure 13:
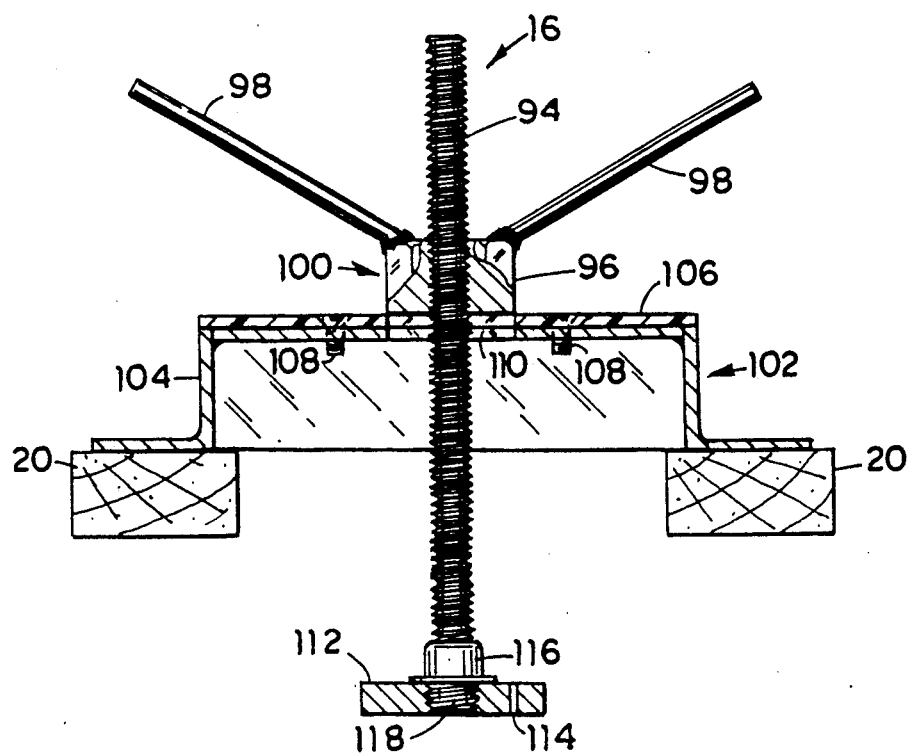
FIG. 13 is a side, cross-sectional view of a sprinkler head puller assembly.

Referring to FIG. 13, valve and head sprinkler adaptor 112 is a circular sleeve comprised of a grooved orifice into which a pipe may be screwed and an O-ring groove around its perimeter (not shown). The diameter of adaptor 112 is substantially identical to the diameter of the cylindrical housing of the sprinkler assembly 22.

It is preferred that adaptor 112 consist essentially of aluminum alloy material and comprise at least one pressure relief hole 114 in the event that water pressure is accidentally introduced into the sprinkler assembly during the head-raising process. Without such hole, in the event of such water-pressure introduction, the lock ring 48 and the adaptor 112 would be difficult if not impossible to remove; with the introduction of a solid shaft into the grooved orifice, the water would have not place to go without the relief hole 114.

Referring again to FIG. 1, threaded shaft 94 is inserted and screwed into the grooved orifice of adaptor 112. Once the threaded shaft has been screwed into the ground orifice of adaptor 112, this assembly is then secured to the cylindrical housing. In general, one may use attachment means provided with the sprinkler assembly 22 to secure adaptor 112/shaft 94 to the housing.

In the embodiment illustrated in FIG. 1, threaded shaft 94 is threaded into adaptor 112, and the two mated parts are installed in sprinkler housing 50 and secured by lock ring 48.

In another embodiment, not shown, the shaft 94/adaptor 112 assembly is secured to the housing 50 by screws passing through adaptor 112.

In one embodiment, not shown, a cover with an orifice in its middle (not shown) is inserted over threaded shaft 94 and down over the top opening of cylindrical housing 50. The use of this cover prevents dirt from entering the cylindrical housing 50 during the process of the invention.

Referring again to FIG. 1A, the next step in the process is to inject water around the sprinkler head housing and to loosen soil around such housing. Such water may be introduced by means well known to those skilled in the art.

In one preferred embodiment, illustrated in FIG. 1, a high-pressure water source is used. As used herein, the term "high-pressure water" refers to water at a pressure of at least about 70 pounds per square inch gravity.

As is illustrated in FIG. 1, suitable high pressure water sources 14 include, e.g., a fixed valve 67 or a water truck 69. In the process of this invention, water is injected around the sprinkler head housing 50 using water injector assembly 12, which may be supplied, e.g., by hose 68.

It is preferred to inject water entirely around the outside of housing 50 at least about a one-foot distance from the perimeter of the housing 50 so that the water is introduced in substantially a concentric circle from the center of such housing After this area has been completely saturated, the injector assembly nozzle 80 may be used to introduce water into a border which is from about 1 to about 2 inches away from the sprinkler head. Using a gentle motion, the saturated soil around said head may be washed away from sprinkler head body 50, thus exposing it.

A support platform through which threaded shaft 94 may extend is then provided. In the embodiment illustrated in FIG. 1, two pieces of wood which are about 3 feet long are placed to form wooden support plates 20 on each side of the sprinkler head body 50. The wood used may be 2"×4" or 2"×6". Thereafter, a substantially a substantially U-shaped puller base assembly 102 is placed over threaded shaft 94 and secured with puller nut 100, which is tightened down as shown in FIG. 1.

Using minimal force, the puller nut assembly is turned in a clockwise direction, thereby raising the sprinkler housing toward the turf surface 34. If excessive resistance to this movement is encountered, water may be injected into various positions 120 to make the soil more fluid and to facilitate the rotation of the puller nut assembly. If a particularly high resistance to the movement is encountered, either side of the puller base 102 may be pounded with a large hammer 18 and/or more water may be injected.

Via this process, the sprinkler body is raised to the proper ground level position. Thereafter, soil is backfilled around the head housing 50 and swing-joint assembly 24. The soil is then fully compacted around the head housing 50. At this point, the assembly 16 may be removed from the sprinkler assembly after removing the lock-ring 48 and/or other means for securing it to the assembly.

Soil is then washed out of the empty housing, and the sprinkler parts are then reinstalled. The system is then moved to the next sunken sprinkler head.

FIGS. 6 through 11 disclose one preferred embodiment of water injector assembly 12. Referring to these figures, such assembly 12 is preferably comprised of: (1) a handle bar 52 fitted with suitable handgrips 54; (2) a lever operated valve 56 operated by lever 58 actuated in direction 60; (3) a quick connect/disconnect female coupling 62; (4) a 36" length of 1/1 inch internal diameter steel tubing 74; and 50 an injection nozzle 80. In one preferred embodiment, the length of the nozzle and of tube is about 40 inches.

The components mentioned may be attached to each other by, e.g., pipe thread adaptors and reducers 64, 70, 72, The nozzle assembly 80 is preferably comprised of at least to pieces: a nozzle barrel 82, and a nozzle point 84, which are welded together at junction 86. Water exists the nozzle in may directions through cross-holes 88 and end hole 90. Each hole 90 serves to direct a stream of water ahead of the nozzle point, helping to push any small wires or vacuum tubing (see element 91 of FIG. 2) that are sometimes used to control sprinkler heads out of the way without damaging them; such stream of water, furthermore, helps bore the nozzle point into compacted soil. Threads 92 secure the nozzle assembly to 12 fitting 78. A male quick connect/disconnect fitting 66 attached to supply hose 68 provides a connection to a high pressure water source 14.

Figure 12:
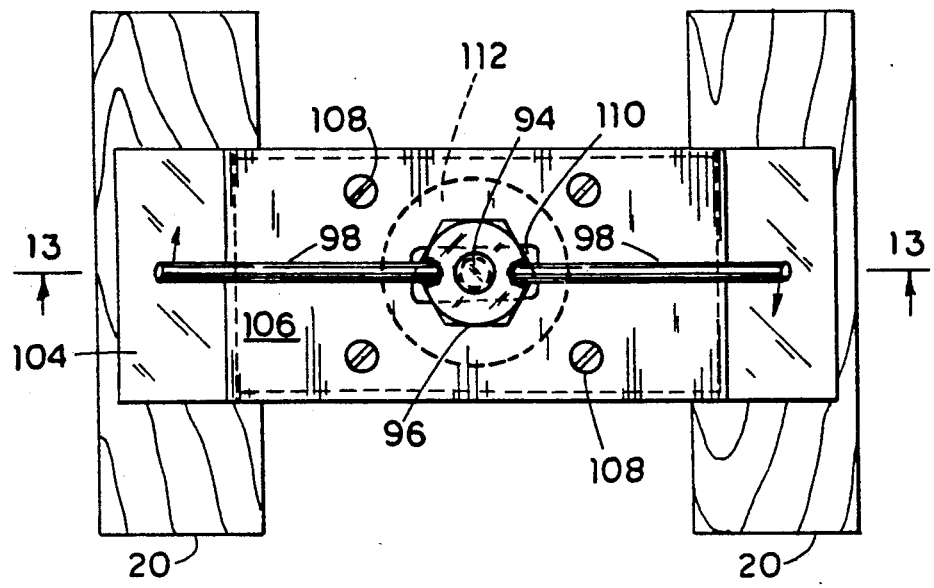
FIG. 12 is a plan view of a sprinkler head puller assembly.

Referring to FIGS. 12 and 13, a means 16 for pulling the sprinkler assembly 22 is illustrated. This assembly 16 is comprised of a threaded shaft 94, puller nut assembly 100, puller base assembly 102, and adaptor 112.

In the preferred embodiment illustrated in FIGS. 12 and 13, threaded shaft 94 is integrally formed with a collar 116 and a screw thread 118 for attaching adaptors to pull sunken sprinkler heads and other such items, such as sunken quick-coupler valves and round valve boxes.

Puller nut assembly 100 is preferably comprised of a puller nut 96 with two puller nut handles 98 integrally welded to the nut (see FIG. 13). In another embodiment, not shown, an integrally cast puller nut assembly is formed by conventional metal casting means.

Puller base assembly 102 is preferably comprised of welded, metallic puller base housing 104; it is preferred that housing 104 consist essentially of either aluminum or noncorrosive metallic material such as, e.g., stainless steel. The puller base assembly is also comprised of nonmetallic top plate 106 which offers little resistance to the rotation of the puller nut assembly 100 and, preferably, will not generate a substantial amount of noise when hit with hammer 18. In one preferred embodiment, top plate 106 consists essentially of nylon, which is used because of the low friction coefficient between it and the steel nut. In addition to facilitating the rotation of the steel nut, the use of the nylon surface protects the base which it covers.

In the embodiment shown in FIGS. 12 and 13, top plate 106 is attached to housing 104 by means of four screws 108, which preferably consist essentially of noncorrodible material such as, e.g., stainless steel. An elongated opening 110 appears at the top of the assembly to accommodate threaded shaft 94. It is preferred that elongated opening 110 be larger than the diameter of threaded shaft 94 so that, if desired, the sprinkler head assembly may be raised on an angle.

Referring to FIGS. 15 through 20, a preferred process for raising a sunken quick-coupler device is illustrated. FIG. 14 shows a side elevational view of a quick coupler 122 set substantially level with turf 34 but primarily supported in soil 36. As is the case with sprinkler heads, quick-couplers also, over a period of time, sink below the turf surface and become unusable. These quick couplers 122 are used in irrigation systems to provide a convenient water source for rapid hose attachment.

The coupler 122 has a bayonet type attachment with the hose rather than threaded connector fittings. Thus, referring to FIG. 16, quick coupler 122 has bayonet locking groove 124 that is adapted to receive the mating male member (not shown) on the hose to be attached.

Referring to FIGS. 17, 18, and 19, there is illustrated a puller adaptor 126 for use with the sprinkler head puller assembly 16. This adaptor 126 is fitted with a male lug 130 that mates with groove 124 in the quick-coupler 122. By mating the puller adaptor 126 female thread 128 with the male thread 118 on the end of screw 94, an effective puller is created to raise sunken quick couplers. This operation is performed in the same manner as that described for raising sunken sprinkler heads, i.e., the flooding of the immediate area around the quick coupler, and its riser, with water, using water injector assembly 12, then pulling the quick-coupler to the desired level using puller assembly 16 (as shown in FIG. 20). Once it is at the desired level, the quick coupler is back filled and is once more ready for use.

Referring to FIGS. 21 through 26, the use of the sprinkler head raising assembly 10 to raise sunken valve boxes 132 is illustrated. As is known to those skilled in the art, valve boxes are used in irrigation systems to cover valves 134 that are just below the turf surface The boxes 132 are generally comprised of a box body 138 and cover 136. The cover often attaches to the body by means of twist-lock lugs 148 engaging body lip 149 after being inserted in the body through opening 150. The valve box puller adaptor 140 makes use of this arrangement by means of adjustable arms 142 and 143 that are attached to the adaptor body 146 with screw 144. By loosening the screw 144, the span of the adaptor arms 142 and 143 may be adjusted to fit the body lip 149 of most sizes of valve boxes. By attaching box puller adaptor 140 using female thread 141 screwed onto male thread 118 of screw 94, as shown in FIG. 26, a puller arrangement for valve box raising is created. By flooding the areas with water using the water injector assembly 12, sunken valve boxes may be pulled to the surface position in the manner previously described.

It is to be understood that the aforementioned description is illustrative only and that changes can be made in the apparatus, the ingredients and their proportions, and in the sequence of combinations and process steps as well as in other aspects of the invention discussed herein without departing from the scope of the invention as defined in the following claims.

I claim:

1. A process for raising an in-ground pop-up sprinkler, comprising the steps of:
   (a) providing an in-ground pop-up sprinkler comprised of a cylindrical housing, a motor compartment structure, and a rotatable sprinkler head, wherein:
      1. said cylindrical housing has a sprinkler compartment, a motor compartment, and an inlet communicating with said motor compartment,
      2. the bottom of said cylindrical housing is closed except for said inlet,
      3. above the bottom end of said cylindrical housing, the housing forms said motor compartment,
      4. above said motor compartment, said housing is radially enlarged to form said sprinkler compartment,
      5. said sprinkler head is capable of limited extension and retraction,
      6. when retracted, said sprinkler head is enclosed within said sprinkler head compartment formed within said housing, and
      7. said sprinkler head is operatively connected o said motor compartment structure;
   (b) clearing the area from around the top of said pop-up sprinkler;
   (c) removing said motor compartment structure and said rotatable sprinkler head from said cylindrical housing;
   (d) providing a sprinkler adaptor, wherein said adaptor is a circular sleeve comprised of a grooved orifice into which a threaded shaft may be screwed and an O-ring around its perimeter, and wherein said adaptor is comprised of at least one pressure relief orifice;
   (e) securing said adaptor to said cylindrical housing;
   (f) introducing water into the ground around said pop-up sprinkler; and
   (g) applying upward pressure on said adaptor, whereby said cylindrical housing is raised.

2. The process as recited in claim 1, wherein said in-ground pop-up sprinkler is attached to a swing-joint.

3. The process as recited in claim 2, wherein a sufficient amount of the area around the top of said pop-up sprinkler is cleared as to leave at least a two inch gap between said head of said pop-up sprinkler and the surrounding ground.

4. The process as recited in claim 3, wherein said gap between said head of said pop-up sprinkler and the surrounding ground extends at least two inches down from the top of said head of said pop-up sprinkler.

5. The process as recited in claim 4, wherein said sprinkler adaptor has a diameter which is substantially identical to the diameter of said cylindrical housing.

6. The process as recited in claim 5, wherein said sprinkler adaptor consists essentially of aluminum alloy material.

7. The process as recited in claim 6, wherein said sprinkler adaptor is operatively connected to a shaft.

8. The process as recited in claim 8, wherein said shaft is a threaded shaft.

9. The process as recited in claim 8, wherein a portion of threaded shaft is disposed within said grooved orifice of said sprinkler adaptor.

10. The process as recited in claim 9, wherein water at a pressure of at least about 70 pounds per square inch gravity is introduced into the ground around said pop-up sprinkler.

11. The process as recited in claim 10, wherein said water is injected entirely around the outside of said cylindrical housing at least about a one-foot distance from the perimeter of said housing.

12. The process as recited in claim 11, wherein said water is injected in a border around said sprinkler head wherein said border is at least about 1 inch away from said sprinkler head.

13. The process as recited in claim 12, wherein a support platform is placed over said sprinkler head.

14. The process as recited in claim 13, wherein said support platform is comprised of a substantially U-shaped assembly comprised of an orifice.

15. The process as recited in claim 14, wherein one end of said threaded shaft is placed through said orifice in said substantially U-shaped assembly.

16. The process as recited in claim 15, wherein said one end of said threaded shaft which is placed through said orifice in said substantially U-shaped assembly is attached to a wing nut.

17. The process as recited in claim 16, wherein upward pressure is applied on said adaptor by turning said wing nut.

18. The process as recited in claim 17, wherein said support platform is pounded with a hammer.

19. The process as recited in claim 18, wherein a cover is placed over the cylindrical cover after said motor compartment structure and said rotatable sprinkler head have been removed from it.

20. The process as recited in claim 19 wherein, after said sprinkler has been raised, soil is backfilled around said sprinkler.